United States Patent
Trigalo et al.

(10) Patent No.: US 11,366,871 B2
(45) Date of Patent: Jun. 21, 2022

(54) SYSTEM AND METHOD FOR COLLECTION OF A WEBSITE IN A PAST STATE AND RETROACTIVE ANALYSIS THEREOF

(71) Applicant: Content Square SAS, Paris (FR)

(72) Inventors: Joël Trigalo, Paris (FR); Antoine Guo, Paris (FR); Luis Diaz, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 16/986,572

(22) Filed: Aug. 6, 2020

(65) Prior Publication Data

US 2022/0043879 A1    Feb. 10, 2022

(51) Int. Cl.
| | | |
|---|---|---|
| *G06F 16/957* | (2019.01) | |
| *G06F 16/958* | (2019.01) | |
| *G06F 40/166* | (2020.01) | |
| *G06N 5/04* | (2006.01) | |
| *G06N 20/00* | (2019.01) | |

(52) U.S. Cl.
CPC ........ *G06F 16/9574* (2019.01); *G06F 16/958* (2019.01); *G06F 40/166* (2020.01); *G06N 5/04* (2013.01); *G06N 20/00* (2019.01)

(58) Field of Classification Search
CPC .. G06F 16/9574; G06F 16/958; G06F 40/166; G06N 20/00; G06N 5/04
USPC ........................................................ 715/234
See application file for complete search history.

(56) References Cited

U.S. PATENT DOCUMENTS

| | | | | |
|---|---|---|---|---|
| 7,383,320 B1* | 6/2008 | Silberstein | ............ | G06F 16/958 |
| | | | | 709/219 |
| 9,330,191 B2* | 5/2016 | Teevan | ................... | G06F 40/14 |
| 9,898,528 B2* | 2/2018 | Kesin | ..................... | G06F 16/367 |
| 10,015,226 B2* | 7/2018 | Scoda | ................... | G06F 16/958 |
| 10,133,710 B2* | 11/2018 | Katic | ..................... | G06F 16/957 |
| 10,567,327 B2* | 2/2020 | Garg | ...................... | G06Q 50/01 |
| 2007/0094244 A1* | 4/2007 | Wolfe | ................. | G06F 16/9574 |
| 2013/0019159 A1* | 1/2013 | Civelli | ................ | H04L 67/2847 |
| | | | | 715/234 |
| 2015/0012811 A1* | 1/2015 | Chan | ..................... | G06F 16/958 |
| | | | | 715/234 |
| 2017/0019489 A1* | 1/2017 | Churchill | ............ | G06F 3/04847 |

* cited by examiner

*Primary Examiner* — William D Titcomb

(74) *Attorney, Agent, or Firm* — Schwegman Lundberg Woessner, P.A.

(57) ABSTRACT

A system and method for collection of a website in a past state and retroactive analysis thereof are provided. The method includes collecting, from a repository, at least one session replay; identifying, in the at least one collected session replay, at least one main state, wherein a main state is a portion of a session replay; selecting at least one webpage snapshot corresponding to a respective main state of the at least one identified main state, wherein each snapshot is a single-instant webpage state at a specific point in time; identifying, in the at least selected one snapshot, at least one webpage zone; and returning the at least one identified zone.

23 Claims, 9 Drawing Sheets

SYSTEM AND METHOD FOR COLLECTION OF A WEBSITE IN A PAST STATE AND RETROACTIVE ANALYSIS THEREOF

TECHNICAL FIELD

The present disclosure relates generally to webpage zone analysis and, in particular, to systems and methods for collection of a website in a past state and retroactive analysis thereof.

BACKGROUND

As retailers, service providers, and other operators of online platforms continue to expand and improve the content made available through user-facing web services, the complexity of the webpages grows as well. The continued development of web-focused content provides site operators with additional avenues by which to connect with users, but also increases the likelihood of web errors. Such web errors may cause significant challenges for website operators, reducing user engagement, revenues, and the like, which may, in turn, harm the operator's business. As a result, website owners, operators, and administrators may seek to better understand the development of a webpage throughout its lifecycle. Further, the same interested parties may seek means to isolate fully-functional webpage versions in order to improve upon the successes thereof.

While a variety of factors may be of interest to webpage owners, operators, and administrators seeking to improve site performance, the isolation of key factors may provide a streamlined web-improvement process. In order to understand which elements of a webpage function as intended and which do not, interested parties may seek zone-analysis tools in order to easily discretize and identify the components of a webpage. While zone analysis may be achieved manually, by collection and labelling of individual webpage zones or elements, such a manual process may be time-consuming where a webpage includes many content elements or zones. In addition, such manual solutions may require more time or effort than a webpage owner, operator, or administrator may wish to allot to zone analysis, particularly where multiple pages are to be analyzed. Further, such manual techniques may be applicable only to a current, "live," version of a webpage, limiting a party's ability to conduct manual zone analyses for previous versions of a webpage.

In addition to the noted difficulties of applying manual zone-identification solutions, such solutions fail to provide for the identification of fully-functional webpages. As a webpage may include multiple faulty features, such as buttons which may be clicked to no effect, links with no destination, and the like, analysis of non-functional webpages may frustrate those seeking to improve site performance. As a result, solutions providing for automatic detection of functional webpage versions, from a set of webpage versions, may be desirable in order to improve the efficiency of webpage zone analysis. However, the described manual zone-identification solutions fail to provide for automatic detection of fully-functional webpage versions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for collection of a website in a past state and retroactive analysis thereof. The method comprises collecting, from a repository, at least one session replay; identifying, in the at least one collected session replay, at least one main state, wherein a main state is a portion of a session replay; selecting at least one webpage snapshot corresponding to a respective main state of the at least one identified main state, wherein each snapshot is a single-instant webpage state at a specific point in time; identifying, in the at least selected one snapshot, at least one webpage zone; and returning the at least one identified zone.

In addition, certain embodiments disclosed herein include a system for collection of a website in a past state and retroactive analysis thereof. The system comprises: a processing circuitry; and a memory, the memory containing instructions that, when executed by the processing circuitry, configure the system to: collect, from a repository, at least one session replay; identify, in the at least one collected session replay, at least one main state, wherein a main state is a portion of a session replay; select at least one webpage snapshot corresponding to a respective main state of the at least one identified main state, wherein each snapshot is a single-instant webpage state at a specific point in time; identify, in the at least selected one snapshot, at least one webpage zone; and return the at least one identified zone.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
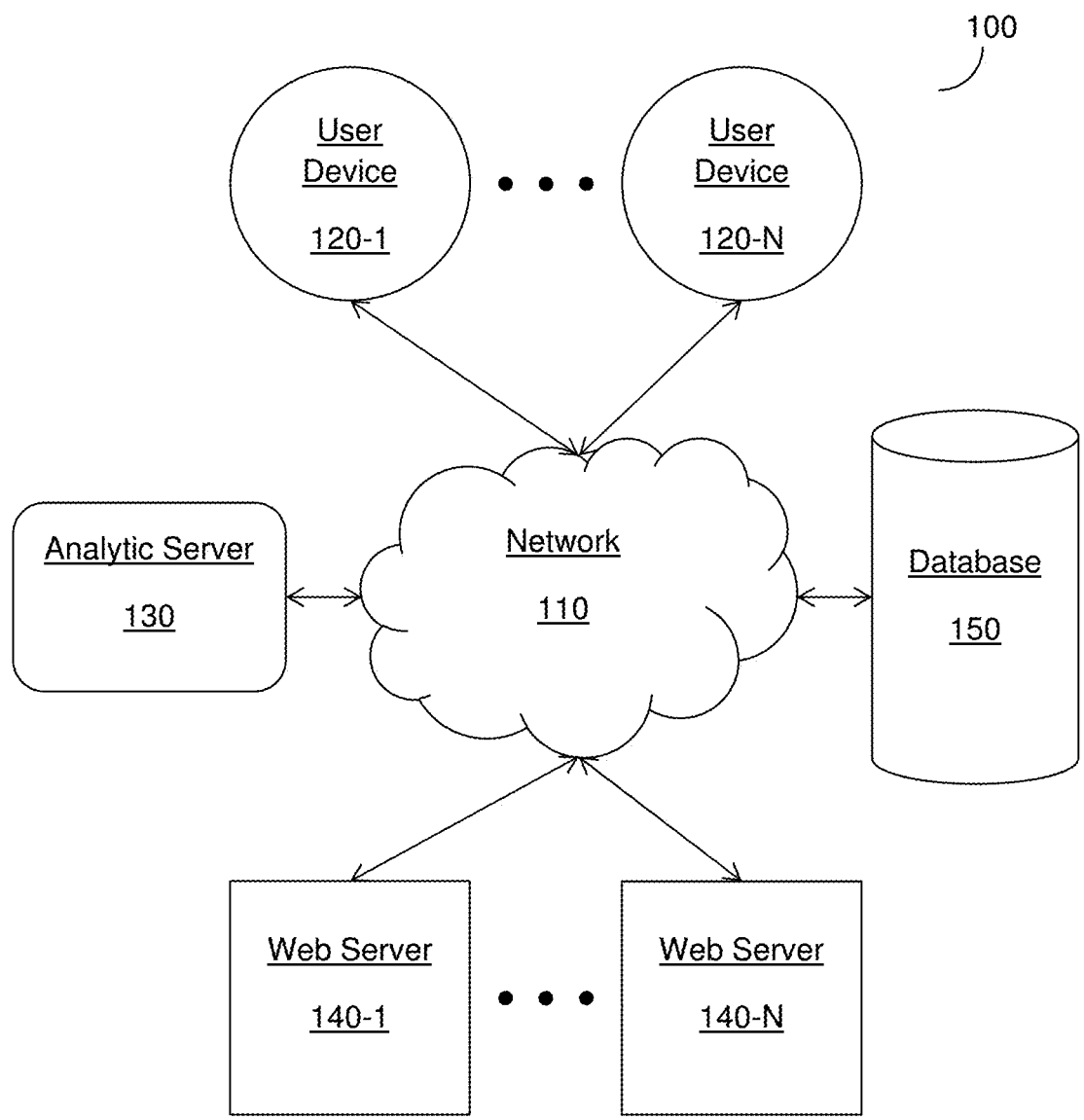
FIG. 1 is an example network diagram depicting a network system disclosing the embodiments for collection of a website in a past state and retroactive analysis thereof.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram depicting a network system 100 disclosing the embodiments for collection of a website in a past state and retroactive analysis thereof. The system 100 includes one or more user devices, 120-1 through 120-N (hereinafter, "user device" 120 or "user devices" 120), an analytic server 130, one or more web servers, 140-1 through 140-N (hereinafter "web server" 140 or "web servers" 140), and a database 150. Further, in the system 100, the various components listed are interconnected via a network 110.

The network 110 provides interconnectivity between the various components of the system. The network 110 may be, but is not limited to, a wireless, cellular, or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth™, long-term evolution (LTE), Wi-Fi, other, like, wireless means, and any combination thereof, via wired means such as, as examples and without limitation, ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing sessions to the system 100 for analysis, receiving returns or outputs from the system 100, configuring system 100 parameters, other, like, purposes, and any combination thereof. Further, a user device 120 may be configured to receive returns or outputs from the web servers 140 to view webpages or other content developed by any of the web servers 140. A user device 120 typically includes a web browser (not shown) or any application (virtual, web, mobile, and the like) which allows a user to view, download, interact with, and engage with content provided by the web servers 140, the analytic server 130, or both. Examples of user devices 120 may be smartphones, personal computers, business systems, dedicated kiosks, tablet computers, and other, like, devices.

Users of the user devices 120 may access at least one website hosted by the servers 140. The website may be, for example, an online retail platform, an e-commerce platform, and the like. In some embodiments, the user devices 120 can access an application installed on and executed by the servers 140. Such an application may include a mobile application (app), a cloud application, a web application, and the like. The various embodiments will be discussed herein with a reference to one or more websites, but are equally applicable to one or more applications.

In an embodiment, a user device 120 may be operated by an administrator of one or more websites hosted by the web server or servers 140. Through the user device 120, reports generated by the analytic server 130 may be viewed. The user device 120 may be further configured to allow for configuration of one or more components of the system 100, issuing or executing instructions, manipulating data, and the like.

The analytic server 130, depicted in detail with respect to FIG. 7, below, is a system configured to execute instructions, organize information, and otherwise process data. The analytic server 130 may be configured to execute the methods described hereinbelow, other, like, methods, and any combination thereof. As described with respect to FIG. 7, below, the analytic server 130 may include various processing, memory, networking, and other components allowing the analytic server 130 to execute instructions and provide data processing. The analytic server 130 may be implemented as physical hardware, as software virtualizing physical hardware, or as a combination of physical and virtualized components. The analytic server 130 may be connected to the network 110 via those means described with respect to the network 110, above. The various processes performed by the analytic server 130 are described in greater detail hereinbelow.

According to the disclosed embodiments, the analytic server 130 is configured to execute instructions for collection of a website in a past state and retroactive analysis thereof. A website in a past state may be any prior version of one or more webpages, including complete and incomplete webpages, as well as various interaction data and site metrics associated therewith.

The web servers 140 may be one or more web sources of data other than the inputs received from the user devices 120. The web servers 140 may include data relating to websites, data relating to webpages, other, like, data, and any combination thereof. Data from the web servers 140 may be stored in the database 150 and may be processed by the analytic server 130. Web servers 140 may be local web sources, remote web sources, or any combination thereof. Examples of web servers 140 include, without limitation, repositories of webpage information, repositories of webpage element or zone classifications, "live" webpages, other, like, sources, and any combination thereof. Web servers 140 may be connected with the network 110 via the means described hereinabove.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including virtualized components, or as a hybrid physical-virtual system. Examples of devices which may be configured as a database 150 in the system 100 include, without limitation, local database hardware, cloud storage systems, remote storage servers, other, like, devices, and any combination thereof.

According to an embodiment, the database 150 may be configured to store or otherwise archive data relating to detection, identification, and analysis of webpage sessions including, without limitation, webpages, user interactions, user sessions, other, like, data, and any combination thereof. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
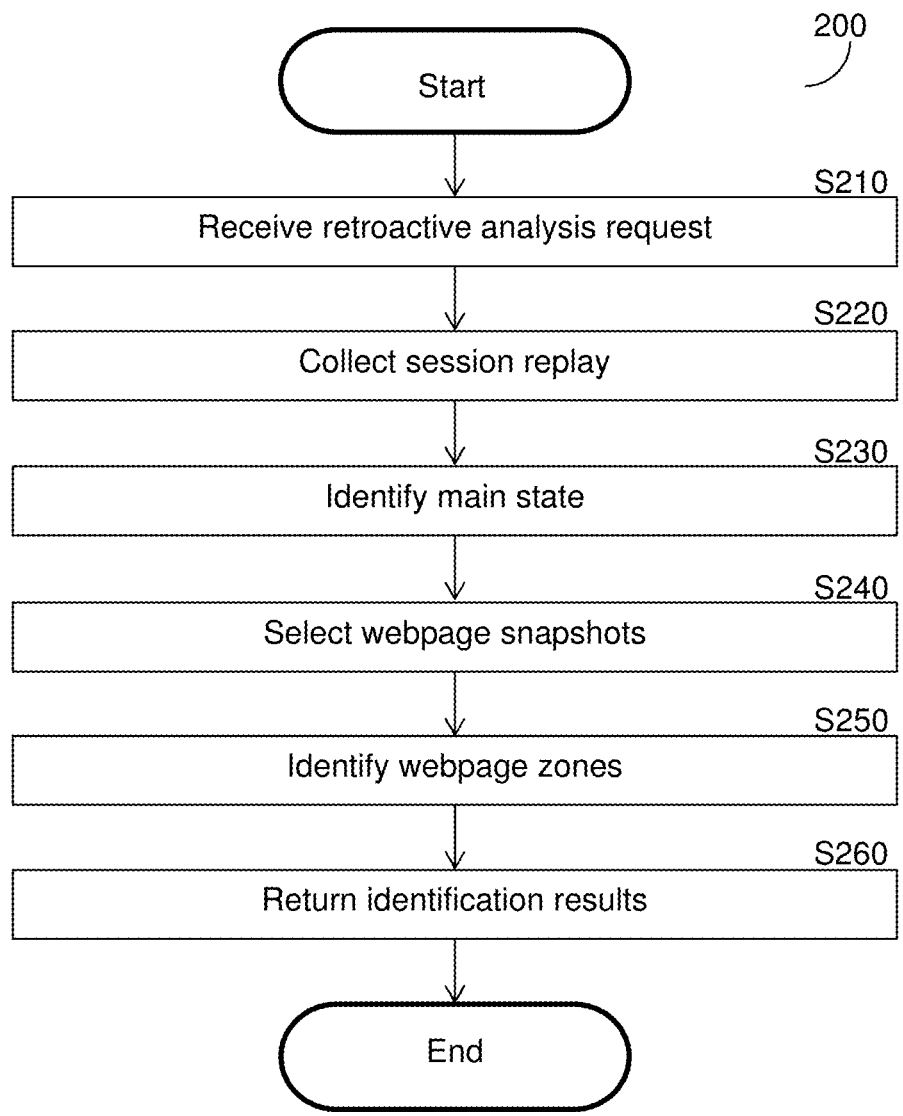
FIG. 2 is a flowchart depicting a method for retroactive zone identification, according to an embodiment.

FIG. 2 is an example flowchart 200 depicting a method for retroactive zone identification, according to an embodiment.

At S210, a retroactive analysis request is received. A retroactive analysis request is a request specifying retroactive analysis of one or more webpages. The received retroactive analysis request may include one or more uniform resource locators (URLs), one or more analysis date, one or more metric of interest, one or more device view specification, other, like, data features describing one or more aspects of the request, and any combination thereof. Further, a retroactive analysis request may be generated through a webpage, accessible through a web browser, as well as an application, and the like, where the web browser, the application, or both, may be installed on a user device, such as the user device, 120, of FIG. 1, above. A retroactive analysis request may be generated using a retroactive zoning analysis request tool, as described with respect to FIG. 6A, below. A retroactive analysis request may be received from a device such as, as an example and without limitation, a user device, such as the user device, 120, of FIG. 1, above.

In an embodiment, the retroactive analysis request received at S210 may include one or more URLs specifying auto-anonymized webpages. An auto-anonymized webpage is a webpage including information automatically anonymized by one or more anonymizing processes. An anonymizing process may be configured to, as examples and without limitation, remove, redact, obfuscate, or otherwise anonymize information including, as examples and without limitation, names, addresses, payment information, other, like, information, and any combination thereof. Where the retroactive analysis request includes one or more URLs specifying auto-anonymized webpages, the auto-anonymized webpages may be pre-anonymized at the time of request receipt, or may be fully or partially anonymized after receipt of the request, including by operation of various features or processes as may be described hereinbelow.

At S220, one or more session replays are collected. A session replay includes collections of user interactions with one or more webpages of a website, describing the user's journey through the website. Session replays may include any or all of the user's interactions with the webpage or webpages between the time that the user connects to the webpage or website and the time the user disconnects from the webpage or website. Session replays may be generated according to various means including, without limitation, the means described with respect to FIG. 3, below. Further, collection of session replays at S220 may include generation of one or more session replay requests, as may be received at S310 of FIG. 3, below. Session replays may be, without limitation, webpages of a user's sessions collected over time, lists of interaction events, other, like, data features, and any combination thereof. The collected webpages may be HTML webpages, DOM of such webpages, and the like, as well as any combination thereof. Session replays may be collected from sources including, without limitation, memory or storage components of an analytic server, such as the analytic server, 130, of FIG. 1, above, from a database, such as the database, 150, of FIG. 1, above, from other, like, sources, and any combination thereof.

Collection of session replays at S220 may further include identification of webpage usage metrics. Webpage usage metrics are numerical indicators quantifying the various webpage interactions included in the session replay or replays collected. Webpage usage metrics may be identified by analysis of interaction events included in one or more session replays such as, as examples and without limitation, clicks on a button, hovers over an image, scrolls down a page, and the like.

Further, webpage usage metrics may be analyzed, following identification, to generate aggregate webpage usage metrics. Aggregate webpage usage metrics describe the overall interactions of multiple users, across multiple sessions, with the webpage. Aggregate webpage usage metrics may include statistics such as, as examples and without limitation, click rates, describing the percentage of site visitors clicking on a given element of a webpage, bounce rates, describing the number of users navigating to a page and leaving the page in a time below a predefined threshold, average time spent browsing a given page across all visitors, and the like, as well as any combination thereof. As an example, where multiple session replays include "click" interaction events, wherein users click on a given webpage feature, each click in the individual session replays may be recorded as contributing to the individual sessions' click metrics, while a click rate may be determined by analysis of the click metrics of each session replay collected.

At S230, website main states are identified. Website main states are states of webpages reflecting the pages' pre-interaction structure and contents. Website main states include the various elements and structures of a webpage, as described by the page's underlying hypertext markup language (HTML) codebase, the page's document object model (DOM), such as is described with respect to FIG. 5, below, or the like, as well as any combination thereof. Identification of website main states at S230 provides for subsequent zone identification, and other, like, analyses, of one or more webpages in a fully-rendered state without user adjustments or inputs. Generation of website main states is described in detail with respect to FIG. 4, below. In addition, identification of website main states may include generation of one or more main state identification requests, as may be received at S410 of FIG. 4, below. Website main states may be data features such as, as examples and without limitation, full webpages, modified or unmodified HTML or other code sets, modified or unmodified DOMs, still images, other, like, features, and any combination thereof. Identified website main states, and various user interactions therewith, where the various user interactions may be included in the one or more session replays collected at S220, may be subsequently analyzed to identify one or more zones, such as at S250, as well as aggregate user interaction metrics, as may be presented as described with respect to FIG. 7, below.

At S240, webpage snapshots are selected based on the determined state. Webpage snapshots are single-instant recordings of the state of a webpage, reflecting the page's structure and contents at the moment of capture. Webpage snapshots may be selected by collection of user snapshot selection input, such as through a snapshot selector, as described with respect to FIG. 6B, below. Webpage snapshots may be website main states, such as those identified at S230, or modified versions thereof.

At S250, webpage zones are identified. Webpage zones are the various content zones, elements, and the like, included in the snapshot or snapshots selected at S240. Webpage zones may be identified by various methods including, without limitation, analysis of webpage HTML or other code, DOM analysis, other, like, analyses, and any combination thereof. Zones may be recorded by means including, without limitation, addition of various data tags, or other, like, features, to the selected snapshot or snapshots, generation of separate zone recording files, such as lists or tables, other, like, means, and any combination thereof. As an example, where a zone is identified according to a method described hereinbelow, the zone may be recorded by appending the selected snapshot's underlying HTML codebase with comments or other data features describing the element identified, the contents of the element, such as a picture or other data feature, other, like, information, and any combination thereof.

Webpage zones may be identified by analysis of webpage HTML, and the like, and analysis of webpage DOMs by application of various techniques including, without limitation, application of machine learning tools, and the like, as well as various combinations thereof. Where a machine learning tool is applied to the identification of zones in a webpage DOM or HTML, the machine learning tool may be configured to correlate one or more HTML or DOM features with various pre-defined webpage zone types.

A machine learning tool, such as may be applicable to the identification of webpage zones, may be configured to execute a zone-identification method based on one or more machine learning trainings. A machine learning training may be a supervised or unsupervised machine learning training, wherein a machine learning tool may be configured to identify zones, and to automatically improve the accuracy of such identifications, based on an administrative response to a zone identification performed on a known data set. Where the zone identification performed on a known dataset produces an identified webpage corresponding with an administrator's understanding of the page's zone identities, the machine learning tool may be described as "trained," and may be applied to the identification of zones in non-training datasets. Where the zone identification performed on a known dataset produces an identified webpage with zone identifications conflicting with an administrator's understanding, mis-identified zones may be flagged for revision, and the identification of the known dataset may be repeated, with methodological changes configured to avoid generating the same flagged identifications, until the machine learning tool reaches a state at which it may be described as "trained," as above.

An example technique for identification of webpage zones is described in detail in U.S. application Ser. No. 16/915,190, assigned to the common assignee, the contents of which are hereby incorporated by reference.

At S260, identification results of webpage zones are returned. Identification results may be returned in formats including, without limitation, static visual displays, interactive visual displays, HTML or other code sets modified to describe the identified zones, such as by the addition of a data tag or other feature, webpage DOMs modified to describe the identified zones, separate files describing the zones identified in corresponding HTML, code, or DOM files, in other, like, formats, and any combination thereof. Returning identification results at S260 may include, without limitation, saving one or more data features to a storage, such as the database, 150, of FIG. 1, above, presenting identification information through a user device, such as the user device, 120, of FIG. 1, above, and the like, as well as any combination thereof. Where an interactive visual display is returned, such a display may be configured to provide identifications of the various webpage zones or elements, specified metrics associated with the various zones or elements, other, like, data features, and any combination thereof. Zoning analysis platforms may be configured to provide interactive visual displays of webpage zone analysis information, and may be understood with respect to FIG. 7, below.

Figure 3:
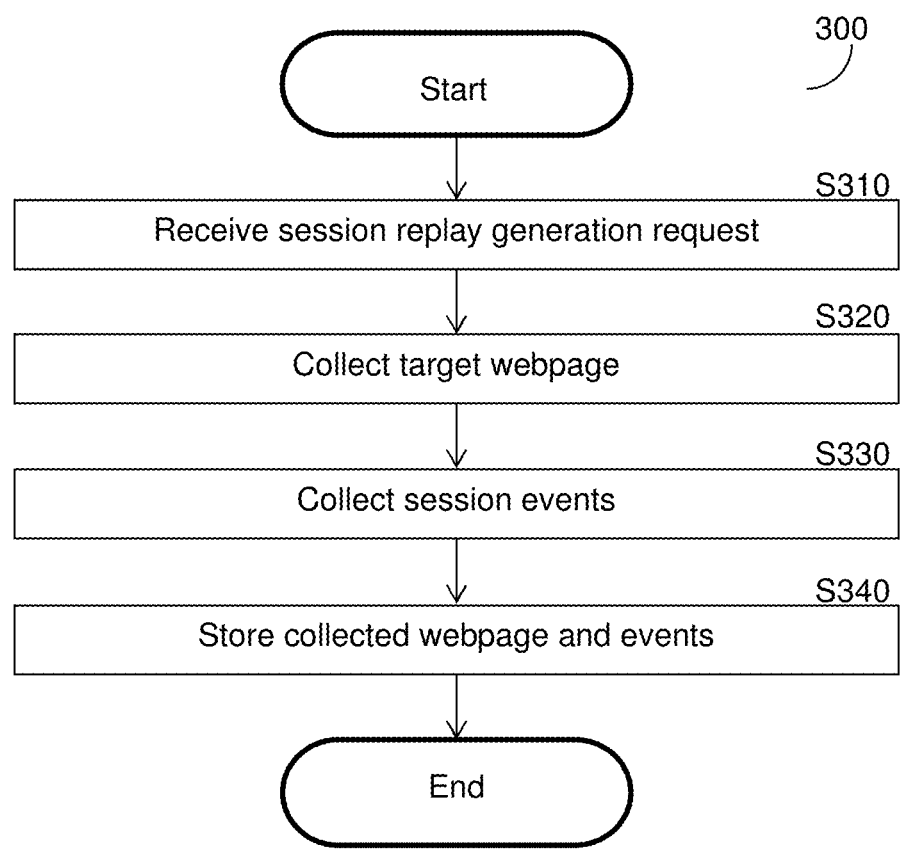
FIG. 3 is a flowchart depicting a method for generating session replays, according to an embodiment.

FIG. 3 is an example flowchart 300 depicting a method for generating session replays, or like files describing the sequence of one or more sessions, according to an embodiment.

At S310, a session replay generation request is received. A session replay generation request is a request describing one or more sessions for replay collection. A session replay generation request may include one or more data features including, without limitation, URLs of one or more target webpages, a date range specification, a collection frequency specification, other, like, features, and any combination thereof. A session replay generation request may be generated automatically, including during the execution of S220, above. Further, a session replay generation replay request may be generated manually by user entry of one or more of the described data features into a session replay request tool, as may be accessible through a web browser or other application, and where such a web browser or application may be installed on a user device, such as the user device, 120, of FIG. 1, above. A session replay generation request may be received from one or more devices including, without limitation, user devices, such as the user devices, 120, of FIG. 1, above, analytic servers, such as the analytic server, 130, of FIG. 1, above, and the like, as well as any combination thereof.

At S320, target webpages are collected. Target webpages are webpages specified in the session replay generation request received at S310. Target webpages may be specified as one or more URLs, where each URL corresponds with a webpage hosted on a web server, such as the web server, 140, of FIG. 1, above. Target webpages may be collected by downloading target webpages in formats including, without limitation, whole webpages, HTML or other code types underlying the specified webpages, webpage DOMs, other, like, formats, or any combination thereof. Further, target webpages may be collected by recording or otherwise transcribing webpage evolution. Webpage evolution may be recorded by, without limitation, downloading webpage versions at any point at which the webpage, webpage DOM, webpage HTML, and the like, undergo one or more changes during a session, as well as timestamps, counters describing the number of evolutions in a session, and the like. Webpage evolution recording may further include recording webpage evolutions in real-time, providing second-for-second playback of changes to a webpage, the webpage's DOM or HTML, or the like. Target webpages may be collected according to one or more bases including, without limitation, scheduled collection, such as collection according to a schedule defined in a session replay generation request received at S310, event-triggered collection, such as collection upon generation of a new DOM for the same webpage, continuous collection, such as over the span of a session, according to other, like, bases, and any combination thereof.

As an example, webpage collection at S320 may include collection of the webpage upon a DOM update. Where collection occurs upon a DOM update, a first webpage version may be collected at the time of user connection, a second version may be collected at the time at which a user hovers over an expanding menu, altering the webpage's DOM to include a pop-out menu, and a third version may be collected at the time at which a user enters an email address into a "newsletter" field, altering the contents of the field element and, thus, the webpage DOM.

At S330, session events are collected. Session events are interactions between a user and a webpage, occurring during the course of a session. Session events may be, as examples and without limitation, mouse clicks on a webpage element, keystrokes, scrolls up or down a page, other, like, events, and any combination thereof. Session events may be collected by one or more means including, without limitation, through a browser extension, included in an web browser installed on a user device, such as the user device, 120, of FIG. 1, above, through an application installed on a user device, such as the user device, 120, of FIG. 1, above, through a tracking tag, token, or other webpage element included in a webpage hosted on a web server, such as the web server, 140, of FIG. 1, above, by other, like, means, and any combination thereof. Where session events are collected through a tracking tag, token, or element included in a webpage, the tracking tag, token, or element may be configured to be invisible and non-interactive from the perspective of a webpage visitor, and may be configured to record some or all of a user's in-session webpage interactions. Session events may be collected on a variety of bases including, without limitation, collection of event batches on a predefined schedule, such as weekly, as may be specified in the session replay generation request received at S310, above, filtered event collection, such as collection only of events including a specific webpage element, continuous collection, other, like, bases. Collection of session events at S330 may further include collection of event types, event targets, event times, describing the point during the session at which the even occurred, other, like, event-related data, and any combination thereof. Session events may be collected in formats including, without limitation, lists, tables, histograms, machine-interpretable formats such as comma-separated values (CSV), other, like, formats, and any combination thereof.

It may be understood that S330 may be executed at any point after the execution of S310 and before the execution of S340, including simultaneously with S320, without loss of generality or departure from the scope of the disclosure.

At S340, collected webpages and events are stored. Collected events and webpages may be stored to one or more storage devices including, without limitation, memory and storage components of an analytic server, such as the analytic server, 130, of FIG. 1, above, various databases, such as the database, 150, of FIG. 1, above, other, like, storage devices, and any combination thereof. Collected webpages and events may be stored separately or as a combined replay. Where collected webpages and events are stored separately, webpages and events may be ordered according to the various timestamps associated therewith, as well as the times of collection, providing for storage of separate event and webpage recordings corresponding to a common timeline, where the common timeline reflects a visitor's session or any portion thereof. Where collected webpages and events are stored as a combined replay, the combined replay may be configured to include a common timeline, describing the course of a session or portion thereof, to which timeline the collected webpages, webpage evolutions, and events may be mapped to provide a single replay of a visitor's session. Where a combined replay is stored at S340, the replay may be stored in a variety of formats including, without limitation, as a replay video, demonstrating the course of the session from the user's perspective, as an enriched video, including the same demonstration from the user's perspective as well as data features describing events and webpage evolutions on a second-for-second basis, timeline-correlated webpage, webpage evolution, and events lists, other, like, formats, and any combination thereof.

Figure 4:
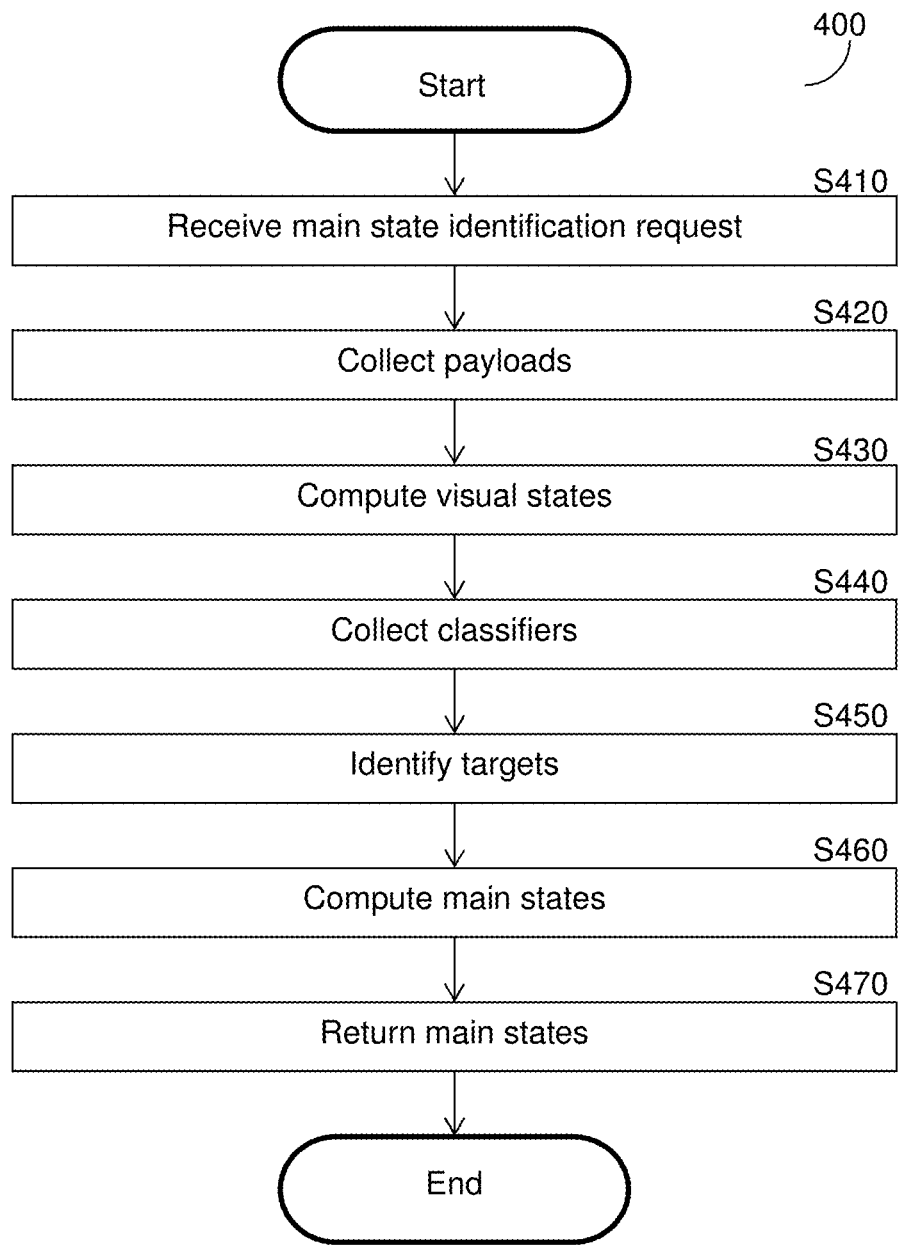
FIG. 4 is a flowchart depicting a method for identifying website main states, according to an embodiment.

FIG. 4 is an example flowchart 400 depicting a method for identifying website main states, according to an embodiment.

At S410, a main state identification request is received. A main state identification request is a request describing one or more session replays for main state identification where, as above, a main state is the state of a webpage reflecting the page's pre-interaction structure and contents. A main state identification request may be generated automatically, such as at the execution of S230 of FIG. 1, above, as well as by other, like means. A main state identification request may include data specifying one or more session replays for analysis. In an embodiment, a main state identification request may include certain filtering or override parameters, where such parameters may be subsequently applied to adjust the processes applied to identify main states, including by allowing for identification of main states after active events, as described hereinbelow. A main state identification request may be received from, without limitation, an analytic server, such as the analytic server, 130, of FIG. 1, above.

At S420, payloads are collected. Payloads may include, without limitation, full session replays, components of session replays such as webpages, webpage HTML codebases, webpage DOMs, various in-session evolutions thereof, session event timelines, and the like, as well as any combination thereof. Payloads may be collected from one or more sources including, without limitation, memory or storage components of an analytic server, such as the analytic server, 130, of FIG. 1, above, databases, such as the database, 150, of FIG. 1, above, from other, like, sources, and any combination thereof.

At S430, visual states are computed. Visual states describe the features of a webpage observable to the user, describing the structure and contents of the visible aspects of the webpage. Visual states may be computed, based on the payloads collected at S420, after every visible change in a webpage during a session, where such visible changes may be represented as DOM changes, with re-computed visual states reflecting the most recent configuration of the webpage. Visual states may be stored, permanently, semi-permanently, or temporarily, to a storage or repository such as those storage and memory components described herein. Visual states may be stored as complete webpages, as webpage HTML or other code, as DOMs, and the like, and any combination thereof. Stored visual states may be appended or otherwise associated with data features describing the point in the session at which a given visual state was computed, the rank or order of the given visual state out of all visual states computed for the session, other, like, visual state data, and any combination thereof.

At S440, classifiers are collected. Classifiers are data features describing content zones or elements as "active" or "inactive." Particularly, a classifier may include an event (or mutation) on an HTML DOM allowing for classification of a target path as active for the event. An "active" content zone or element is a content zone or element with which user interaction generates a visual change to a webpage, thereby altering the DOM of the visible version of the webpage. Examples of user interactions which may be applicable to such alterations of the DOM of the visible version of a webpage include, without limitation, clicks, mouse hovers, scrolls up or down a webpage, other, like, interactions, and any combination thereof. An example of an "active" content zone or element is an expanding menu button which, when clicked, expands into a menu occupying the top half of the webpage, thereby altering the DOM. An "inactive" content zone or element is a content zone or element with which user interaction does not produce a visible change to a webpage. An example of an "inactive" element is a product image on a retail website, where no visible change is generated by a user's click on the product image. Classifiers may be collected from one or more sources including, without limitation, classifier repositories, dictionaries, and the like, as well as any combination thereof which may be collected from one or more sources including, without limitation, the web server, 140, of FIG. 1, above, the database, 150, of FIG. 1, above, the analytic server, 130, of FIG. 1, above, and the like, as well as any combination thereof. Classifiers may be generated automatically, such as by analysis of webpage HTML to detect elements with which an interaction generates a DOM change. Further, classifiers may be manually defined, including by manual review of webpage elements and attribution of various classifiers to each reviewed element. In an embodiment, classifiers may be generated by means including, without limitation, application of machine learning, artificial intelligence, and other, like, techniques, as well as any combination thereof.

At S450, targets are identified. Targets are webpage zones or elements with which, during the course of a session described by a feature of a payload collected at S420, a user is recorded interacting once or more. Targets may be identified by analysis of events included in the payloads collected at S420. Targets may include, as examples and without limitation, buttons, fields, and other, like, webpage zones or elements. Identified targets may be recorded by generating one or more registers describing the various events, zones or elements, event times, event orders or ranks, and other, like, data, as collected at S420. Target identification registers may be stored or archived in one or more temporary, permanent, or semi-permanent storage media, such as those described herein.

At S460, main states are computed. Main states may be computed as the visual states immediately preceding the first interaction event with a target having an "active" classifier. Where event timelines collected at S420 correlate with visual states computed at S430, describing both the contents of the session and the site visitor's view of the webpage during the session, a main state may be identified. A main state may be identified by correlating the event timelines collected at S420 with the targets identified at S450 and applying the classifiers collected at S440 to the same collected targets. Where a timeline of events includes a first triggering interaction with an "active target," where a triggering interaction is an interaction generating a DOM-altering webpage change, a main state may be identified as the latest-computed visual state which was computed prior to the first triggering interaction.

As an example, a loading website may undergo several DOM changes as content elements are downloaded from a web server and presented to a site visitor. At each DOM change, a new visual state may be computed, and prior visual states may be cached or stored as described hereinabove. In the same example, after the webpage has loaded, a site visitor may click first on a product image, generating no DOM change, and, subsequently, on an expanding menu button, generating a DOM change. In the example, the site visitor's click on the menu button is a triggering event, while the user's click on the product image is not. As a result, in the same example, the main state is computed as the most-recent visual state computed prior to the visitor's click on the menu button.

At S470, main states are returned. Main states may be returned as complete webpages, as webpage HTML or other, like, codebases, as webpage DOMs, and the like, as well as any combination thereof.

Figure 5:
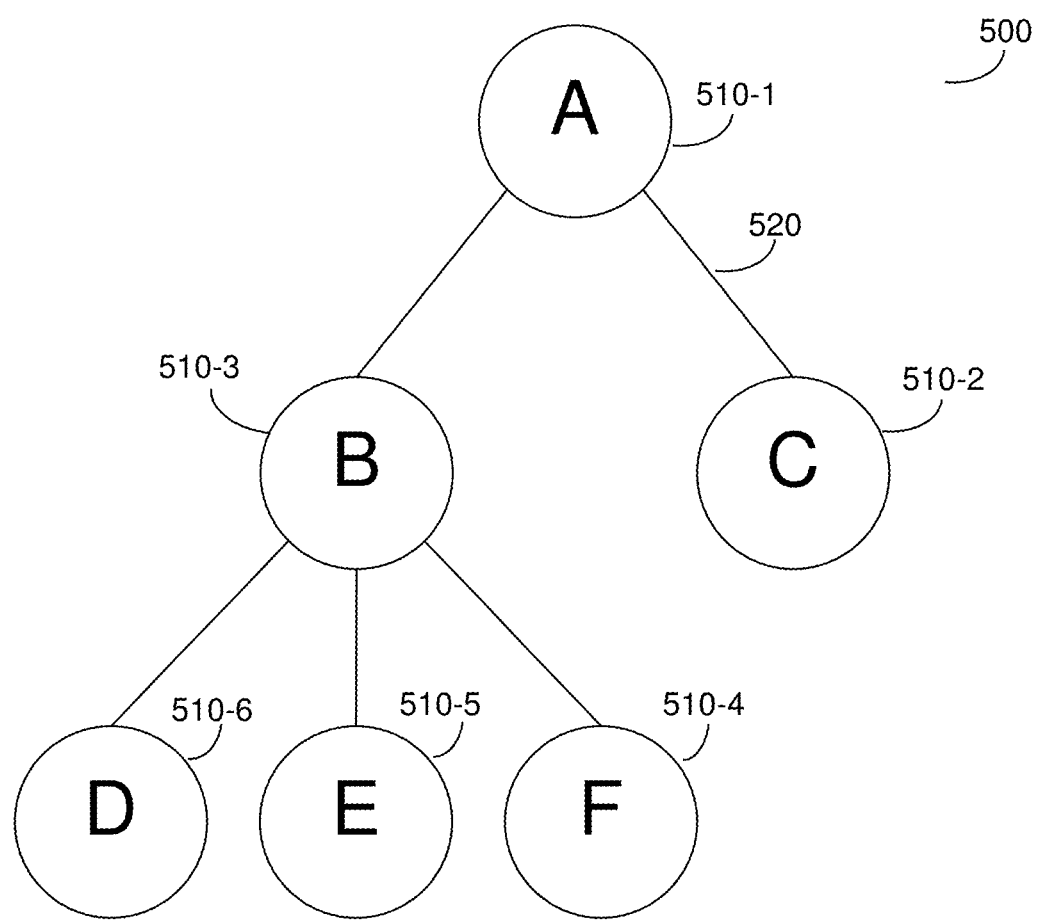
FIG. 5 is a diagram depicting an unlabeled document object model (DOM) tree, according to an embodiment.

FIG. 5 is an example diagram depicting an unlabeled document object model (DOM) tree 500, according to an embodiment. The unlabeled DOM tree 500 provides a visual representation of the hierarchical structure of a webpage's HTML code, with content zones or elements represented as nodes, 510-1 through 510-6 (hereinafter, "nodes" 510). In the example unlabeled DOM tree 500, related nodes 510 are joined by "links" 520, representing the relationships between two nodes 510. In the example unlabeled DOM tree 500, links 520 are established between nodes 510-1 and 510-2 and between nodes 510-3 and 510-1.

In the example unlabeled DOM tree 500, nodes 510-3 and 510-2 are disposed on a second tier below the first tier occupied by node 510-1, reflecting a structure wherein the content element or zone represented by node 510-1 includes the content elements or zones represented by nodes 510-2 and 510-3. Although only the link 520 between nodes 510-1 and 510-2 is labeled, this label is provided for simplicity, and other, like, links 520 may be likewise labeled without loss of generality or departure from the scope of the disclosure.

Figure 6A:
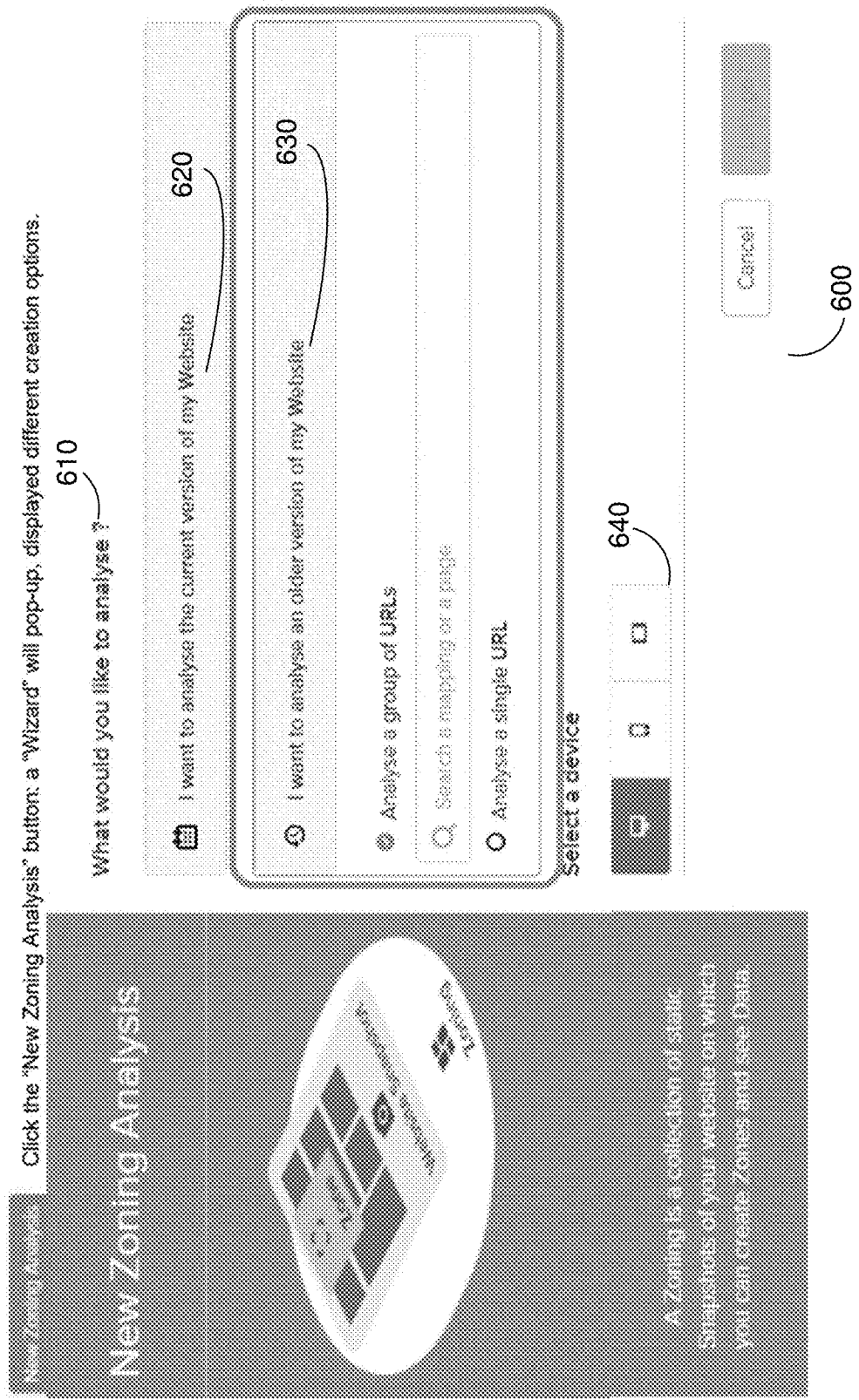
FIG. 6A is an illustration depicting a retroactive zoning analysis request tool, according to an embodiment.

FIG. 6A is an illustration 600 depicting a retroactive zoning analysis request tool, according to an embodiment. A retroactive zoning analysis tool, such as that depicted in the illustration 600, may be configured to accept user input and generate a retroactive zoning analysis request therefrom. Such a tool may be included as a feature of a webpage, accessible through a web browser, or as an application, where a such a web browser, such an application, or both, may be installed on a user device, such as the user device, 120, of FIG. 1, above.

The retroactive zoning analysis request tool depicted in the illustration 600 includes a mode selector 610, with selections for "current version" mode 620 and "older version mode" 630, as well as a device view selector 640. The tool may be configured to, when the "current version" mode 620 selection is selected, generate a retroactive zoning analysis request including a specification requesting analysis of a current or live webpage. Such a "current mode" request may be configured to initiate the execution of various processes described hereinabove with respect to a live version of a given webpage. Where the "older version" mode 630 is selected, the tool may be configured to accept one or more user inputs describing one or more URLs for analysis according to the methods described hereinabove.

Further, the tool may be configured to generate a retroactive zoning analysis request specifying a given device view mode. As a webpage may be rendered differently for presentation via different devices, such as desktop computers, smart phones, and tablet computers, analysis of the various renderings may result in different outputs. Where a device view mode is selected via the device view selector 640, the tool may be configured to generate a retroactive zoning analysis request specifying analysis of one or more webpages formatted for display on the selected device or devices.

Figure 6B:
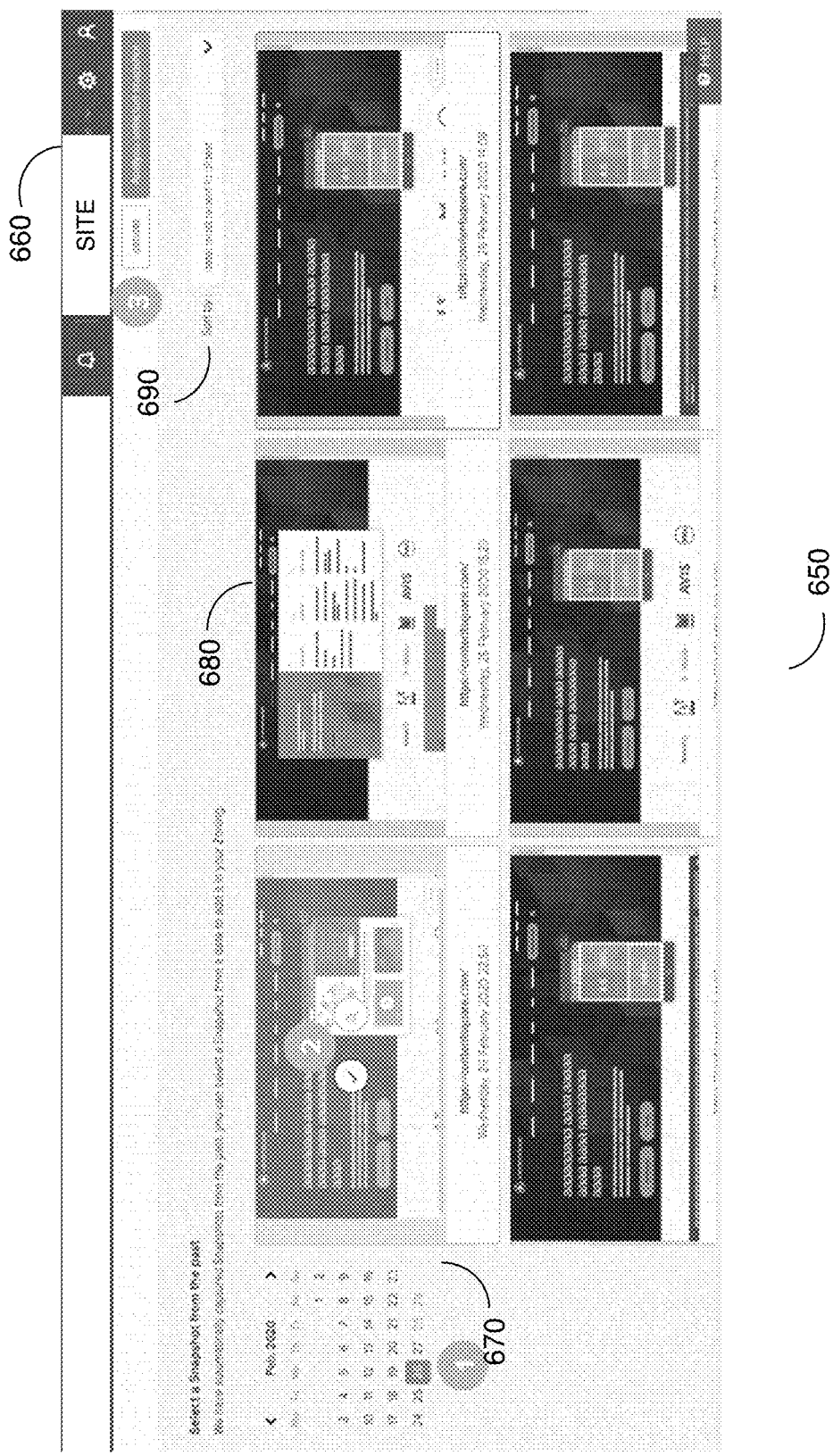
FIG. 6B is an illustration depicting a snapshot selector, according to an embodiment.

FIG. 6B is an illustration 650 depicting a snapshot selector, according to an embodiment. A snapshot selector may be applicable to the selection of one or more snapshots during a snapshot selection process, such as at S240, above. The snapshot selector 650 may be provided as a feature of a website or webpage, accessible through a web browser, as an application or a feature of an application, or the like, and any combination thereof, where both a web browser and such an application may be installed on a user device, such as the user device, 120, of FIG. 1, above, either separately or in combination.

The snapshot selector included in the illustration 650 includes a site selector 660, a date selector 670, one or more snapshots 680, and a snapshot sort tool 690. The site selector 660 may be configured to provide for the selection of a website or webpage of interest, including from a list of websites or webpages for which snapshots are available. The site selector 660 may be configured to be a drop-down list, an open-ended text entry field, and the like. The date selector 670 may be configured to provide for the selection of a date or range of dates for which snapshots are available. The snapshot sort tool 690 may be configured to provide for sorting snapshots, within the specified webpage or site and the specified date or date range, based on factors including, without limitation, the snapshots' timestamps, as well as other, like, factors.

The snapshots 680 may include one or more webpage snapshots, collected as described hereinabove, for the specified webpage or site and the specified date or date range. The snapshots 680 may be sorted using the snapshot sort tool 690. The snapshots 680 may include one or more descriptive data features including, without limitation, snapshot URL, snapshot date, snapshot time, other, like, factors, and any combination thereof.

It may be understood that, while one snapshot 680 in the illustration 650 is labeled for simplicity, other, like, snapshots may be likewise labeled without loss of generality or departure from the scope of the disclosure.

Figure 7:
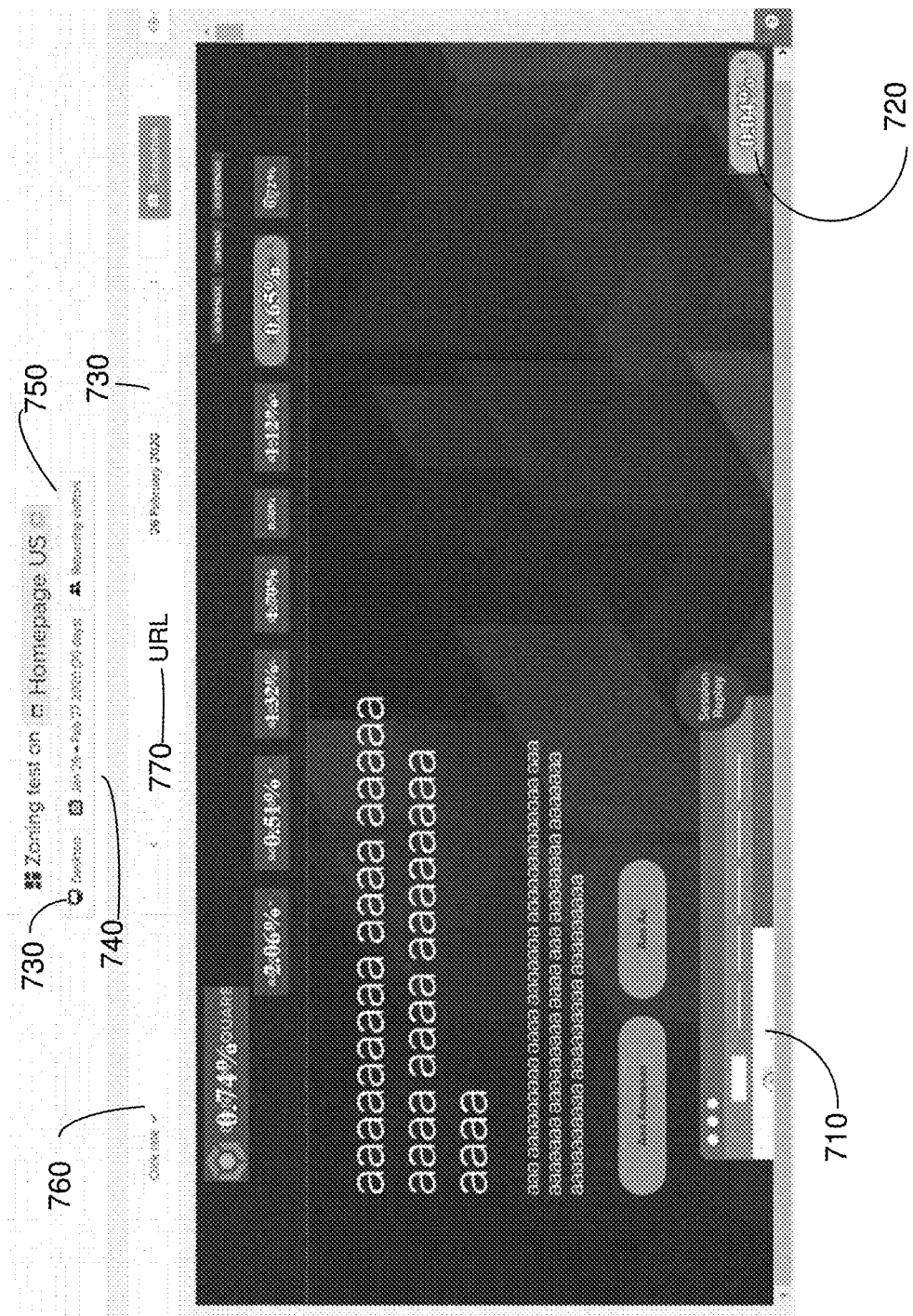
FIG. 7 is an illustration of a zoning analysis presentation platform, according to an embodiment.

FIG. 7 is an illustration 700 of a zoning analysis presentation platform, according to an embodiment. A zoning analysis presentation platform, such as that included in the illustration 700, may be configured to provide visual outputs and reports, as provided according to the methods described hereinabove, as well as to accept user input, where accepted user input may be applicable to configuration of the platform for various views, reports, and outputs. A zoning analysis presentation platform may be provided as a feature of a website or webpage, accessible through a web browser, as an application or feature of an application, and the like, as well as any combination thereof, where a web browser and an application may be installed on a user device, such as the user device, 120, of FIG. 1, above, either separately or in combination.

The zoning analysis presentation platform depicted in the illustration 700 includes a viewing pane 710, one or more zone analysis overlays 720, a device view mode selector 730, a date range selector 740, a conditions selector 750, a metric selector 760, a URL selector 770, and a version date selector 780. The viewing pane 710 may be configured to present a version of a selected webpage, based on the various selectors, including zone analysis overlays 720. Zone analysis overlays 720 provide per-zone reportings of the various zone identities and metrics identified and collected as described hereinabove. Zone analysis overlays 720 may be configured to provide aggregate zone metric values including, without limitation, averages, medians, and the like, as well as any combination thereof, as described with respect to S220, above. Although only one zone analysis overlay 720 is labeled for purposes of simplicity, it may be understood that some or all zone analysis overlays 720 may be so labeled without loss of generality or departure from the scope of the disclosure.

The device view mode selector 730 may be configured to provide for the selection of a device view mode, in which view mode the selected webpage or site is presented in the viewing pane 710. Examples of device view modes include desktop mode, tablet computer mode, mobile phone mode, and the like. The date range selector 740 may be configured to provide for the selection of various date ranges. Where a date range is selected through the date range selector 740, the data included in the calculation of aggregate metric values presented in the zone analysis overlays 720 may be limited to only those metric values collected during the specified date range. The conditions selector 750 may be configured to restrict the metric values used in the calculation of aggregate metric values, where aggregate metric values are presented in the zone analysis overlays 720, to only those metric values matching the selected conditions. Example conditions which may be applicable to restrict metric values include, without limitation, values collected from sessions with lengths longer than one hour, values collected from sessions including specific internet protocol (IP) addresses, other, like, conditions, and any combination thereof.

The metric selector 760 may be configured to provide for selection of one or more metrics of interest, where the selected metrics of interest are presented through the zone analysis overlays 720. The metric selector 760 may be configured as, as examples and without limitation, a "search" field, a drop-down list, a multiple-choice selector, and the like. The URL selector 770 may be configured to provide for selection of a webpage or site for presentation through the viewing pane 710, as well as analysis as described hereinabove. The URL selector 770 may be configured as a drop-down list, an open-ended text-entry field, or the like. The version date selector 780 provides for selection of a version of the webpage or site selected via the URL selector 770, at a specified date, for presentation through the viewing pane 710 and analysis as described hereinabove. In an embodiment, the version date selector 780 may be configured to open or launch a snapshot or version selector, such as that described with respect to FIG. 6B, above, to provide for selection of a preferred site snapshot or version where multiple snapshots or versions are included for the specified date and URL.

Figure 8:
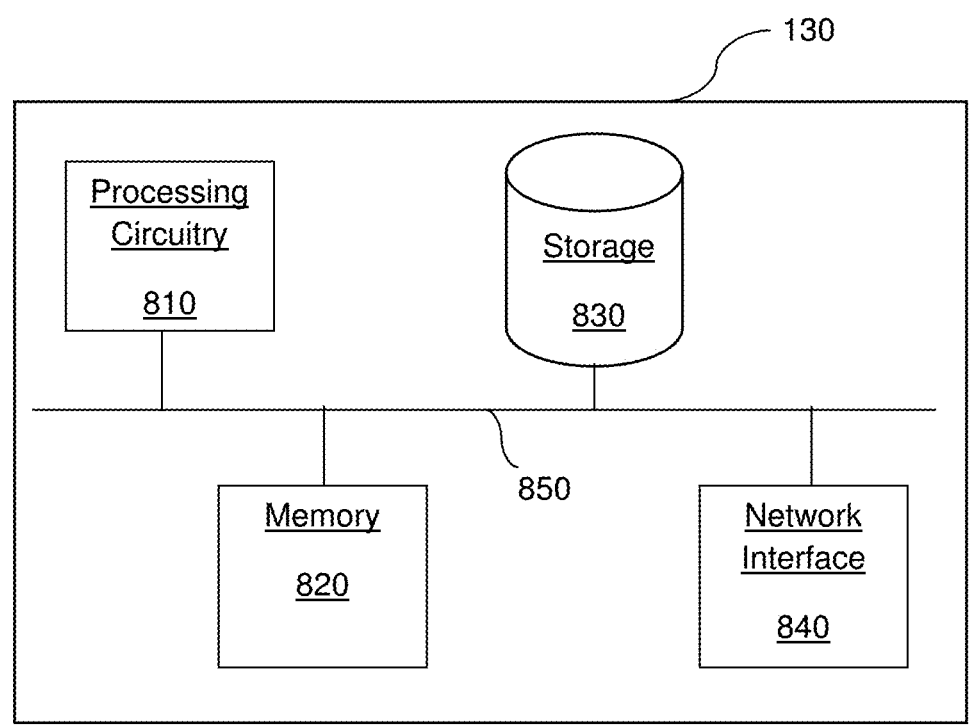
FIG. 8 is a schematic diagram of an analytic server, according to an embodiment.

FIG. 8 is an example schematic diagram of an analytic server 130, according to an embodiment. The analytic server 130 includes a processing circuitry 810 coupled to a memory 820, a storage 830, and a network interface 840. In an embodiment, the components of the server 130 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 840 allows the analytic server 130 to communicate with the various components, devices, and systems described herein for collection of a website in a past state and retroactive analysis thereof, as well as other, like, purposes.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Further, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for collection of a website in a past state and retroactive analysis thereof, comprising:
    collecting, from a repository, at least one session replay;
    identifying, in the at least one collected session replay, at least one main state, wherein a main state is a portion of a session replay that represents a state of a webpage prior to receiving user input from a user on the website;
    receiving a selection from the user of a webpage snapshot from a plurality of webpage snapshots, the selected webpage snapshot corresponding to a respective main state of the at least one identified main state, wherein each snapshot is a single-instant recording of a webpage state at a specific point in time, the snapshot comprising descriptive data features that reflect webpage structure and webpage content at the specific point in time;
    identifying, in the at least selected one snapshot, at least one webpage zone; and
    returning the at least one identified zone.

2. The method of claim 1, wherein the main state comprises pre-interaction webpage structure and webpage content.

3. The method of claim 1, wherein at least one collected session replay includes a description of a webpage visitor's interactions with a webpage.

4. The method of claim 3, wherein the at least one collected session replay further includes: descriptions of visitors' interactions with an auto-anonymized webpage.

5. The method of claim 1, herein identifying at least one main state further comprises:
    collecting a payload;
    computing, from the collected a payload, at least one visual state;
    collecting a plurality of classifiers;
    identifying a plurality of zones of the at least one computed visual state;
    computing a main state; and
    returning the computed main state.

6. The method of claim 5; wherein the at least one computed visual state is a single-instant description of a website's visual state from a perspective of a site visitor.

7. The method of claim 5, wherein the collected payload is a session replay.

8. The method of claim 5, further comprising:
    generating the plurality of classifiers using a machine learning model.

9. The method of claim 8, wherein each of the plurality of collected classifiers is any one of: active and inactive.

10. The method of claim 1, further comprising:
generating the at least one session replay; and
storing the at least one generated session replay in the repository.

11. The method of claim 10, wherein generating the at least one session replay further comprises:
collecting a target webpage;
collecting a plurality of session events, wherein a session event is an interaction by a user with one or more zones or elements of the target webpage; and
storing the collected target webpage and the plurality of session events.

12. A non-transitory computer readable medium having stored thereon instructions for causing a processing circuitry to execute a process for collection of a website in a past state and retroactive analysis thereof, the process comprising:
collecting, from a repository, at least one session replay;
identifying, in the at least one collected session replay, at least one main state, wherein a main state is a portion of a session replay that represents a state of a webpage prior to receiving user input from a user on the website;
receiving a selection from the user of a webpage snapshot from a plurality of webpage snapshots, the selected webpage snapshot corresponding to a respective main state of the at least one identified main state, wherein each snapshot is a single-instant recording of a webpage state at a specific point in time, the snapshot comprising descriptive data features that reflect webpage structure and webpage content at the specific point in time;
identifying, in the at least selected one snapshot, at least one webpage zone; and
returning the at least one identified zone.

13. A system for collection of a website in a past state and retroactive analysis thereof, comprising:
a processing circuitry; and
a memory, the memory containing instructions that, when executed by the processing circuitry, configure the system to perform operations comprising:
collecting, from a repository, at least one session replay;
identifying, in the at least one collected session replay, at least one main state, wherein a main state is a portion of a session that represents a state of a webpage prior to receiving user input from a user on the website;
receiving a selection from the user of a webpage snapshot from a plurality of webpage snapshots, the selected webpage snapshot corresponding to a respective main state of the at least one identified main state, wherein each snapshot is a single-instant recording of a webpage state at a specific point in time, the snapshot comprising descriptive data features that reflect webpage structure and webpage content at the specific point in time;
identifying, in the selected one snapshot, at least one webpage zone; and
returning the at least one identified zone.

14. The system of claim 13, wherein the main state comprises pre-interaction webpage structure and webpage content.

15. The system of claim 13, wherein at least one collected session replay includes a description of a webpage visitor's interactions with a webpage.

16. The system of claim 15, wherein the at least one collected session replay further includes: descriptions of visitors' interactions with an auto-anonymized webpage.

17. The system of claim 13, wherein the operations further comprise:
collecting a payload;
computing, from the collected a payload, at least one visual state;
collecting a plurality of classifiers;
identifying a plurality of zones of the at least one computed visual state;
computing a main state; and
returning the computed main state.

18. The system of claim 17, wherein the at least one computed visual state is a single-instant description of a website's visual state from a perspective of a site visitor.

19. The system of claim 17, wherein the collected payload is a session replay.

20. The system of claim 17, wherein the operations further comprise:
generating the plurality of classifiers using a machine learning model.

21. The system of claim 20, wherein each of the plurality of collected classifiers is any one of: active and inactive.

22. The system of claim 13, wherein the operations further comprise:
generating the at least one session replay; and
storing the at least one generated session replay in the repository.

23. The system of claim 22, wherein the operations further comprise:
collecting a target webpage;
collecting a plurality of session events, wherein a session event is an interaction by a user with one or more zones or elements of the target webpage; and
storing the collected target webpage and the plurality of session events.

* * * * *

UNITED STATES PATENT AND TRADEMARK OFFICE
CERTIFICATE OF CORRECTION

PATENT NO. : 11,366,871 B2
APPLICATION NO. : 16/986572
DATED : June 21, 2022
INVENTOR(S) : Trigalo et al.

It is certified that error appears in the above-identified patent and that said Letters Patent is hereby corrected as shown below:

In the Specification

In Column 10, Line 17, delete "FIG. 1," and insert --FIG. 2,-- therefor

In the Claims

In Column 16, Line 48, in Claim 5, delete "herein" and insert --wherein-- therefor In Column 16, Line 58, in Claim 6, delete "claim 5;" and insert --claim 5,-- therefor Signed and Sealed this
Twenty-first Day of February, 2023

Katherine Kelly Vidal
*Director of the United States Patent and Trademark Office*